(12) United States Patent
Tian et al.

(10) Patent No.: US 10,932,605 B2
(45) Date of Patent: Mar. 2, 2021

(54) RICE COOKING DEVICE

(71) Applicant: Hangzhou Xiangtian Technology Co., Ltd., Hangzhou (CN)

(72) Inventors: Zhongliang Tian, Hangzhou (CN); Xin Li, Hangzhou (CN)

(73) Assignee: HANGZHOU XIANGTIAN TECHNOLOGY CO., LTD., Hangzhou (CN)

( * ) Notice: Subject to any disclaimer, the term of this patent is extended or adjusted under 35 U.S.C. 154(b) by 265 days.

(21) Appl. No.: 16/183,335

(22) Filed: Nov. 7, 2018

(65) Prior Publication Data

US 2019/0133364 A1  May 9, 2019

(30) Foreign Application Priority Data

Nov. 7, 2017  (CN) .......................... 201721469844.6
Dec. 18, 2017  (CN) .......................... 201721777532.1

(51) Int. Cl.
*A47J 27/04* (2006.01)
*A47J 27/00* (2006.01)
(Continued)

(52) U.S. Cl.
CPC ............. *A47J 27/04* (2013.01); *A47J 27/004* (2013.01); *A47J 27/05* (2013.01); *A47J 27/0802* (2013.01);
(Continued)

(58) Field of Classification Search
CPC ...... A47J 27/04; A47J 2027/043; A47J 27/05; A47J 27/06; A47J 27/16
(Continued)

(56) References Cited

U.S. PATENT DOCUMENTS 3,800,778 A * 4/1974 Lohr ....................... A47J 27/16
126/369
5,649,476 A * 7/1997 Montagnino ........... A47J 27/04
122/31.1
(Continued)

FOREIGN PATENT DOCUMENTS

KR  20-0309600  4/2003
KR  20-0358052  8/2004
(Continued)

*Primary Examiner* — Reginald Alexander
(74) *Attorney, Agent, or Firm* — Muncy, Geissler, Olds & Lowe, P.C.

(57) ABSTRACT

The present disclosure provides a rice cooking device, which includes a base, a water storage assembly, a heating assembly, a steaming assembly, and a pressure regulating assembly. The water storage assembly includes a shell, a water storage container, and an energy gathering cover. The shell is disposed in the base, the water storage container is disposed in the shell, and the energy gathering cover is disposed in the water storage container. The energy gathering cover divides the water storage container into a first chamber positioned outside the energy gathering cover and a second chamber positioned inside the energy gathering cover. A water flow channel is formed between the first chamber and the second chamber. The heating assembly is disposed between the shell and the water storage container. The steaming assembly includes a steaming container and a steaming rack, wherein the steaming container is disposed in the water storage assembly, and a guide channel is formed between the steaming container and the energy gathering cover. The guide channel respectively communicates with the steaming container and the energy gathering cover. A steaming chamber is formed between the steaming rack and the steaming container. The pressure regulating assembly is disposed in the base and communicates with the water storage container. The pressure regulating assembly regu-
(Continued)

lates the pressure in the first chamber to press water in the water storage container into the steaming container through the water flow channel or the guide channel or suck water in the steaming container back into the water storage container.

11 Claims, 9 Drawing Sheets

(51) Int. Cl.
    *A47J 27/092*    (2006.01)
    *A47J 27/08*     (2006.01)
    *A47J 27/05*     (2006.01)
(52) U.S. Cl.
    CPC ........ *A47J 27/092* (2013.01); *A47J 2027/043* (2013.01)
(58) Field of Classification Search
    USPC .............................. 99/410; 126/369; 219/401
    See application file for complete search history.

(56) References Cited

U.S. PATENT DOCUMENTS

| | | | |
|---|---|---|---|
| 6,107,605 A * | 8/2000 | Creamer | A21B 1/24 219/401 |
| 7,208,702 B2 | 4/2007 | Choi | |
| 2008/0017629 A1* | 1/2008 | Xu | F24C 15/327 219/401 |
| 2008/0047172 A1 | 2/2008 | You | |
| 2010/0196572 A1* | 8/2010 | Sloot | A47J 27/04 426/510 |
| 2015/0223627 A1* | 8/2015 | Li | A47J 27/0802 99/337 |
| 2019/0053521 A1* | 2/2019 | Tian | A47J 36/32 |

FOREIGN PATENT DOCUMENTS

| | | |
|---|---|---|
| KR | 2013-0025547 A | 3/2013 |
| KR | 101360463 B1 | 2/2014 |
| WO | WO-2010044286 A1 | 4/2010 |

* cited by examiner

RICE COOKING DEVICE

CROSS REFERENCE TO RELATED APPLICATIONS

This application is based upon and claims priority to Chinese Patent Application No. 201721469844.6 filed on Nov. 7, 2017 and Chinese Patent Application No. 201721777532.1 filed on Dec. 18, 2017, the entire contents thereof are incorporated herein by reference.

TECHNICAL FIELD

The present disclosure relates to the field of household appliance, and more particularly, to a rice cooking device.

BACKGROUND

At present, in most of electric rice cookers commercially available, water and rice are placed in inner containers of the electric rice cookers, then lids are covered and the electric rice cookers are powered on, such that the objective of automatically cooking rice is implemented by way of electrical heating. When rice is cooked by using the existing electric rice cookers, starches in the rice are dissolved out in water, the starches are gelatinized under the action of high temperature, and then the gelatinized starches are attached to surface layer of the rice as moisture is dried, which causes rice soft and sticky and taste poorer.

In contrast, a lot of starches remain in rice water, such that cooked rice is low in sugar content, and cooked rice is dry and plump in grain and better in taste, and thus can better satisfy people's requirements for healthy diet. To implement the objective of steaming rice, the existing electric rice cookers generally are internally provided with lifting mechanisms used for driving inner containers to lift. Upon completion of the soaking procedure, the lifting mechanisms drive the inner containers to lift to implement the operation of water draining, and then water is heated to steam the rice. However, the existing electric rice cookers are complex in structure, not smooth enough in water inflow and water draining, slow in generating steam and long in cooking time because they heat all water during heating procedures.

SUMMARY

To overcome the problem of the existing rice cooking devices which are not smooth in water inflow and water draining, the present disclosure provides a rice cooking device which is smooth in water draining and can cook rice.

To achieve the above objective, the present disclosure provides a rice cooking device, which includes a base, a water storage assembly, a heating assembly, a steaming assembly, and pressure regulating assembly. The water storage assembly includes a shell, a water storage container, and an energy gathering cover. The shell is disposed at the base, the water storage container is disposed in the shell, and the energy gathering cover is disposed in the water storage container. The energy gathering cover divides the water storage container into a first chamber positioned outside the energy gathering cover and a second chamber positioned inside the energy gathering cover. A water flow channel is formed between the first chamber and the second chamber. The heating assembly is disposed between the shell and the water storage container. The steaming assembly includes a steaming container and a steaming rack, wherein the steaming container is disposed at the water storage assembly, and a guide channel is formed between the steaming container and the energy gathering cover. The guide channel respectively communicates with the steaming container and the energy gathering cover. A steaming chamber is formed between the steaming rack and the steaming container. The pressure regulating assembly is disposed at the base and communicates with the water storage container. The pressure regulating assembly regulates the pressure in the first chamber to press water in the water storage container into the steaming container through the water flow channel or the guide channel or suck water in the steaming container back into the water storage container.

According to an embodiment of the present disclosure, the energy gathering cover includes an energy gathering cover body and a sealing element. The energy gathering cover body is a cone-shaped structure, and an upper end of the cone protrudes out of a bottom of the steaming container. The sealing element is disposed at a joint between the energy gathering cover body and the steaming container.

According to an embodiment of the present disclosure, a top of the energy gathering cover is provided with a first air vent and a first water vent. The first air vent is positioned above the first water vent, and the first air vent communicates with the guide channel.

According to an embodiment of the present disclosure, the bottom of the steaming container is provided with a recess having a second air vent and a second water vent, wherein the second air vent and the first air vent are disposed corresponding to each other, and the second water vent and the first water vent are disposed corresponding to each other.

According to an embodiment of the present disclosure, the energy gathering cover includes an energy gathering cover body and a sealing element. The energy gathering cover body includes an energy gathering inner cover and an energy gathering outer cover. A side wall of the energy gathering inner cover is provided with an air vent communicating with the guide channel. The energy gathering outer cover is sleeved on an outside of the energy gathering inner cover and forms an accommodating space together with the energy gathering inner cover. A top of the energy gathering outer cover is openmouthed, and the air vent is positioned higher than the top of the energy gathering outer cover. The sealing element is disposed at a joint between the energy gathering outer cover and the steaming container.

According to an embodiment of the present disclosure, both a diameter of the energy gathering inner cover and a diameter of the energy gathering outer cover gradually decrease from a bottom to a top of the energy gathering inner cover, and the side wall of the energy gathering inner cover is a circular curved surface curved toward an inside of the energy gathering inner cover.

According to an embodiment of the present disclosure, a bottom of the water storage container is provided with an engaging platform for engaging with the energy gathering cover, and a gap between an outer wall of the engaging platform and an inner wall of the energy gathering cover forms the water flow channel.

According to an embodiment of the present disclosure, the steaming rack includes a barrier plate and a steam transmission plate. The steam transmission plate is provided with a through hole, and the steam transmission plate is disposed at a periphery of the barrier plate, and the barrier plate bulges toward a top of the steaming container.

According to an embodiment of the present disclosure, the barrier plate is disposed above the energy gathering cover, and a vertical projection area of the barrier plate is larger than an area of a top of the energy gathering cover.

According to an embodiment of the present disclosure, the pressure regulating assembly includes an air pump for boosting pressure in the first chamber and a relief valve for reducing pressure in the first chamber. The air pump is provided with an air inlet, a pipe for communicating the first chamber with the air inlet is provided between the shell and the water storage container, the water storage container is provided with a communicating channel for communicating with outside air, and the relief valve is configured to open or shut off communication between the communicating channel and the outside air.

According to an embodiment of the present disclosure, a protruding platform for communicating with the pipe is disposed at a bottom of the shell, and a coupling bracket is disposed on the base. The protruding platform is sleeved on and connected with the coupling bracket when the water storage assembly is disposed on the base, the communicating channel is formed between the protruding platform and the coupling bracket, the communicating channel communicates with the air inlet of the air pump and the pipe, and the communicating channel communicates with the relief valve.

According to an embodiment of the present disclosure, the base includes a sealing ring sleeved on the coupling bracket. A communicating channel is formed between the protruding platform and the sealing ring when the protruding platform is sleeved on and connected with the coupling bracket, and the sealing ring is provided with a hollow column head connecting the communicating channel with the pressure regulating assembly.

In conclusion, in the rice cooking device provided by the present disclosure, the energy gathering cover is disposed in the water storage container, such that the energy gathering cover divides the water storage container into the first chamber and the second chamber. The water flow channel is formed between the first chamber and the second chamber. The guide channel is formed between the energy gathering cover and the steaming container. Therefore, when the pressure regulating assembly changes the pressure in the first chamber, the water in the water storage container is pressed into the steaming container through the water flow channel and the guide channel, or the water in the steaming container is sucked back into the water storage container along the opposite path. It is convenient for water to flow into and drain out of the steaming chamber, and corresponding conditions for water inflow and water draining can be achieved simply by controlling the pressure in the first chamber. Further, in the stage of cooking rice, the guide channel also serves as a steam transmission channel to combine the water channel and the steam channel, which not only greatly simplifies the structure of the rice cooking device but also effectively solves the problem that water inflow and water draining assemblies of an existing rice cooking device have a negative effect on steam transmission efficiency, thereby significantly increasing steam heating efficiency and making cooked rice taste good.

Moreover, the first air vent and the first water vent are provided on the energy gathering cover body, and the first air vent is positioned above the first water vent, such that the water in the energy gathering cover body is heated to generate steam and the steam is mingled with lots of water droplets, the water droplets drop back into the energy gathering cover body through the first air vent, and the steam enters the steaming chamber through the first air vent and the guide channel. Alternatively, the energy gathering cover body includes an energy gathering inner cover and an energy gathering outer cover. The energy gathering inner cover is provided with an air vent positioned higher than the energy gathering outer cover. When the water in the energy gathering inner cover is heated, steam mingled with water droplets is outputted from the air vent. In this output process, under the action of gravity, the water droplets drop back to the accommodating space between the energy gathering inner cover and the energy gathering outer cover. In this way, the objective of removing the water droplets mingled in the steam is accomplished, thereby greatly improving taste of rice at the bottom of the steaming rack. The steaming rack includes the barrier plate and the steam transmission plate. When water droplets boiled and splashed out of the energy gathering cover reach the steaming chamber, the barrier plate obstructs the water droplets in the steaming chamber and prevents the water droplets from entering the steaming rack. The horizontal cross-sectional area of the barrier plate is larger than the top surface area of the energy gathering cover, which may effectively obstruct water droplets boiled and splashed out of the energy gathering cover, thereby improving the obstruction quality.

To make the above and other objectives, features and advantages of the present disclosure more apparent and pellucid, a detailed description is made below by illustrating preferred embodiments with reference to the accompanying drawings.

DETAILED DESCRIPTION

Figure 1:
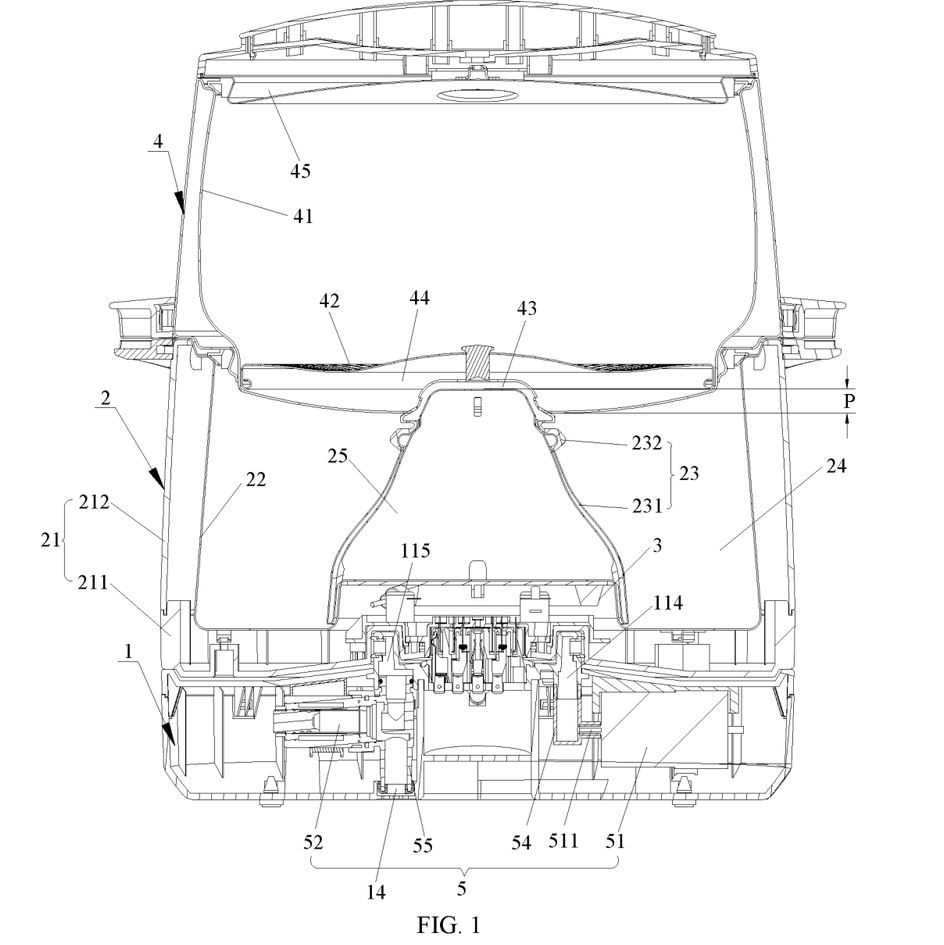
FIG. 1 is a sectional view of a rice cooking device along a vertical direction according to an embodiment of the present disclosure.
Figure 2:
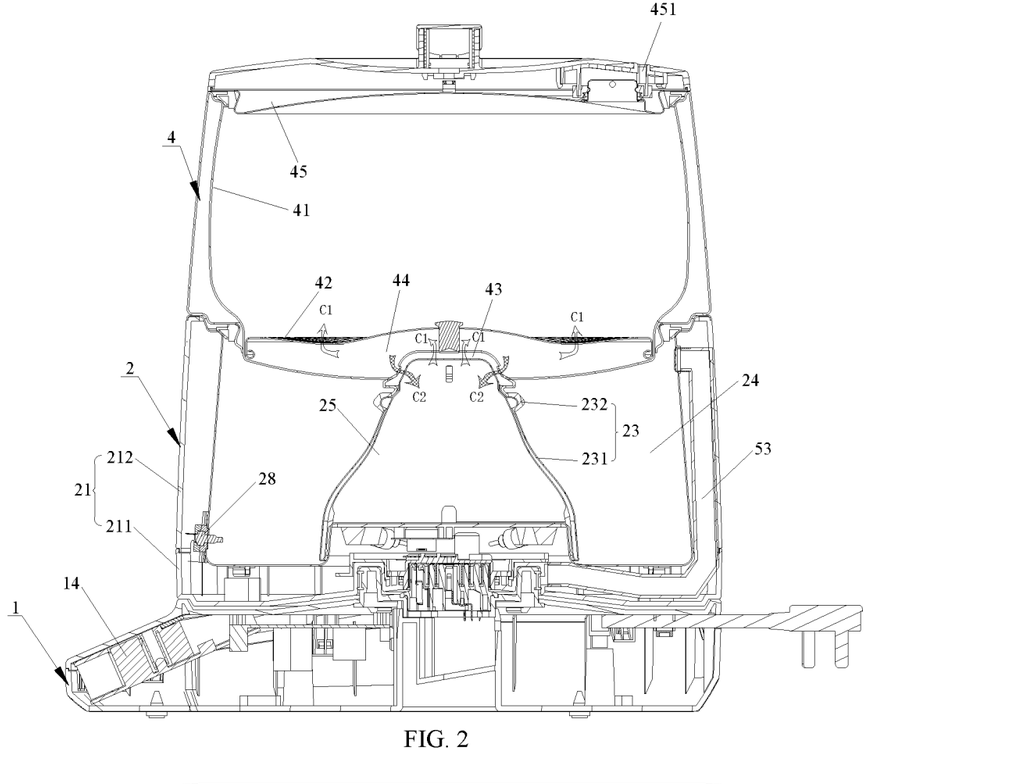
FIG. 2 is a sectional view of a rice cooking device along a vertical direction at another viewing angle according to an embodiment of the present disclosure.
Figure 3:
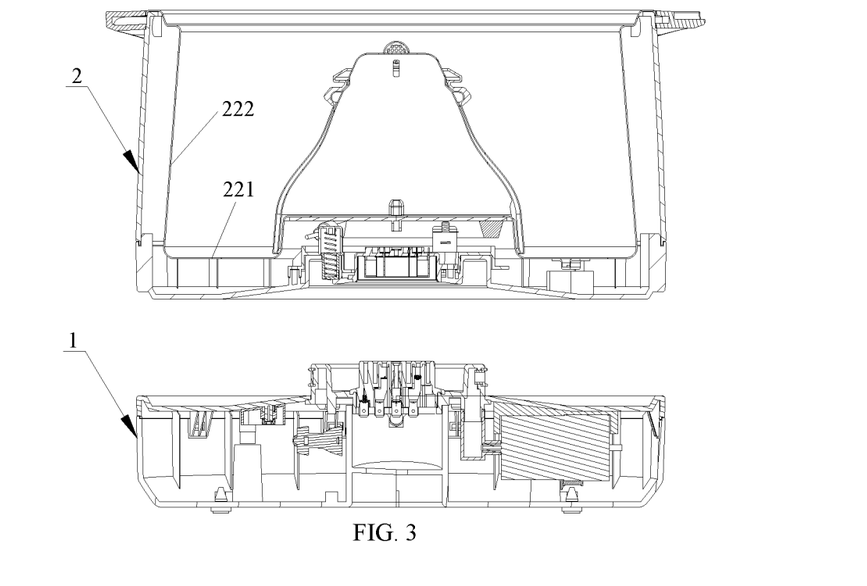
FIG. 3 is an exploded schematic view of a bottom shell and a base in a rice cooking device according to an embodiment of the present disclosure.
Figure 4:
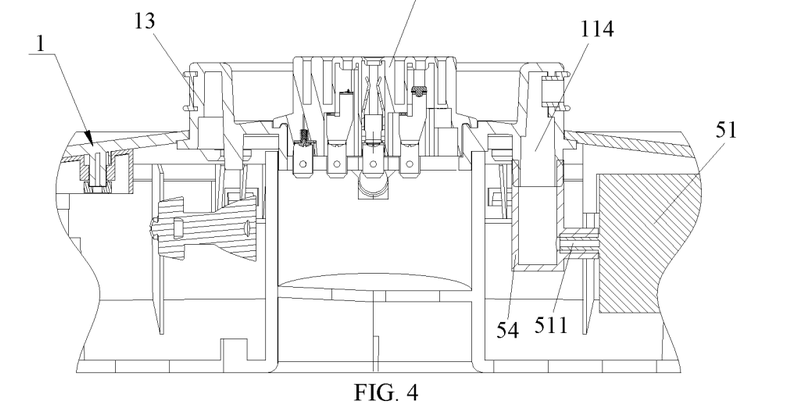
FIG. 4 is a partial enlarged view showing the bottom shell is disassembled from the base in FIG. 3.

As shown in FIG. 1 and FIG. 2, the rice cooking device provided in this embodiment includes a base 1, a water storage assembly 2, a heating assembly 3, a steaming assembly 4, and a pressure regulating assembly 5. The water storage assembly 2 includes a shell 21, a water storage container 22, and an energy gathering cover 23. The shell 21 is disposed at the base 1, the water storage container 22 is disposed in the shell 21, and the energy gathering cover 23 is disposed in the water storage container 22. The energy gathering cover 23 divides the water storage container into a first chamber 24 positioned outside the energy gathering cover and a second chamber 25 positioned inside the energy gathering cover. A water flow channel 26 is provided between the first chamber 24 and the second chamber 25. The heating assembly 3 is disposed between the shell 21 and the water storage container 22. The steaming assembly 4 includes a steaming container 41 and a steaming rack 42, wherein the steaming container 41 is disposed at the water storage assembly 2, and a guide channel 43 is formed between the steaming container 41 and the energy gathering cover 23. The guide channel 43 respectively communicates with the steaming container 41 and the energy gathering cover 23. A steaming chamber 44 is formed between the steaming rack 42 and the steaming container 41. The pressure regulating assembly 5 is disposed at the base 1 and communicates with the water storage container 22. The pressure regulating assembly 5 regulates the pressure in the first chamber 24 to press water in the water storage container 22 into the steaming container 41 through the water flow channel 26 or the guide channel 43 or suck water in the steaming container 41 back into the water storage container 22.

In the rice cooking device provide by this embodiment, the energy gathering cover 23 is disposed in the water storage container 22. The energy gathering cover 23 divides the water storage container 22 into a first chamber 24 and a second chamber 25. The water flow channel 26 is formed between the first chamber 24 and the second chamber 25, and the guide channel 43 is formed between the energy gathering cover 23 and the steaming container 41. In a soaking stage, water in the first chamber 24 flows into the second chamber 25 through the water flow channel 26 under the action of the pressure regulating assembly 5 and flows into the steaming container 41 through the guide channel 43 to soak food material on the steaming rack 42. After the food material absorbs water and satisfies requirements, the pressure regulating assembly 5 changes the pressure in the first chamber 24, such that water in the steaming container 41 flows back into the first chamber 24 along the guide channel 43 and the water flow channel 26. In a steaming stage, water in the energy gathering cover 23 is heated by the heating assembly 3 to produce a lot of steam. The steam enters the steaming container 41 through the guide channel 43 to steam the food material on the steaming rack 42. In the rice cooking device provided by this embodiment, the guide channel 43 transmits different media in different stages to implement the recombination of the water channel and the steam channel, such that not only water inflow and water draining are smooth but also the structure of the whole rice cooking device is compact, thereby greatly reducing the size of the rice cooking device.

Figure 5:
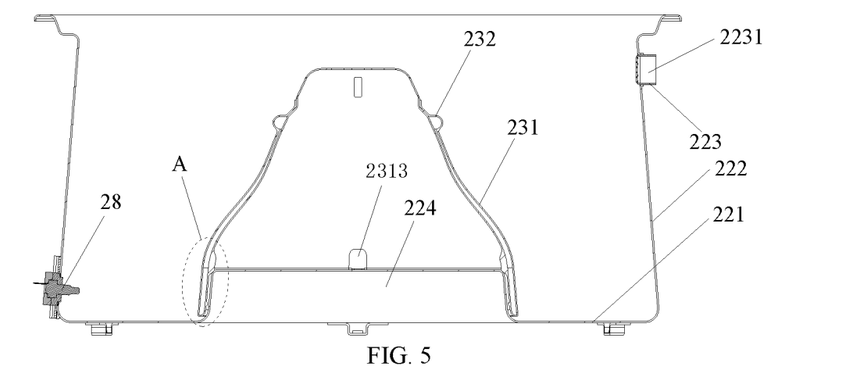
FIG. 5 is a schematic sectional view showing an energy gathering cover connected to a water storage container in a rice cooking device according to an embodiment of the present disclosure.
Figure 6:
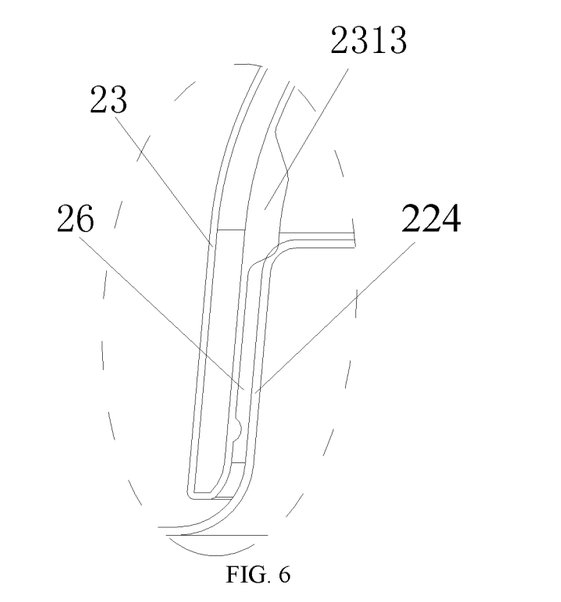
FIG. 6 is an enlarged view of the place A in FIG. 5.

In this embodiment, as shown in FIG. 5 and FIG. 6, a bottom of the water storage container 22 is provided with an engaging platform 224 for engaging with the energy gathering cover. In this embodiment, an inside wall of the energy gathering cover 23 is provided with a snap 2313 engaging with the engaging platform 224. A gap between an outer wall of the engaging platform 224 and an inner wall of the energy gathering cover 23 forms the water flow channel 26. A connecting structure between the energy gathering cover 23 and the water storage container 22 is so simple that the energy gathering cover 23 can be easily connected to the water storage container 22, and the formed structure of the water flow channel 26 is so simple to successfully satisfy work requirements.

Figure 10:
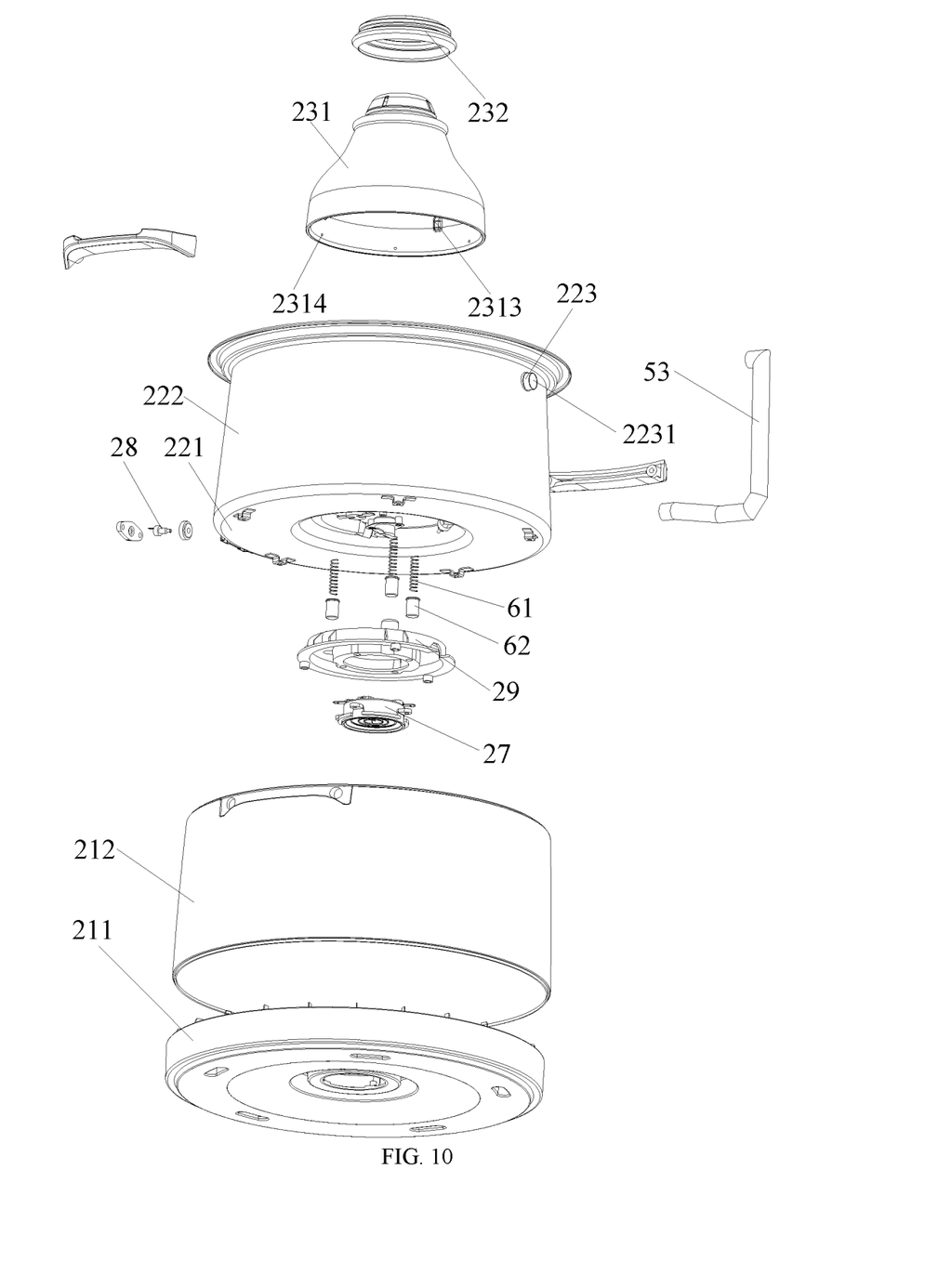
FIG. 10 is an exploded schematic view of a water draining and steaming assembly in a rice cooking device according to an embodiment of the present disclosure.
Figure 11:
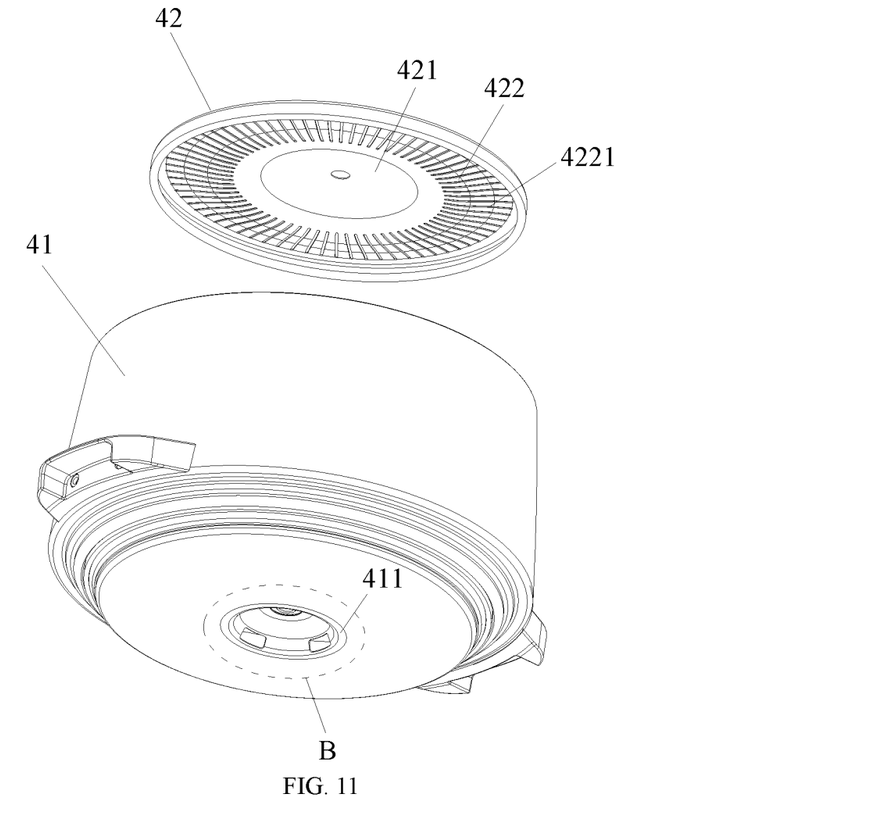
FIG. 11 is an exploded schematic view of a steaming container and a steaming rack in FIG. 10.

In this embodiment, as shown in FIG. 10, on the bottom or bottom surface of the energy gathering cover 23 there is provided a water inlet 2314. When the energy gathering cover 23 is disposed in the water storage container 22, the water inlet 2314 ensures that an effective water seal is formed between the energy gathering cover and the water storage container to prevent air in the water storage container from entering the steaming container through the energy gathering cover so as to prevent steam from having a negative effect on steaming the food material.

Figure 7:
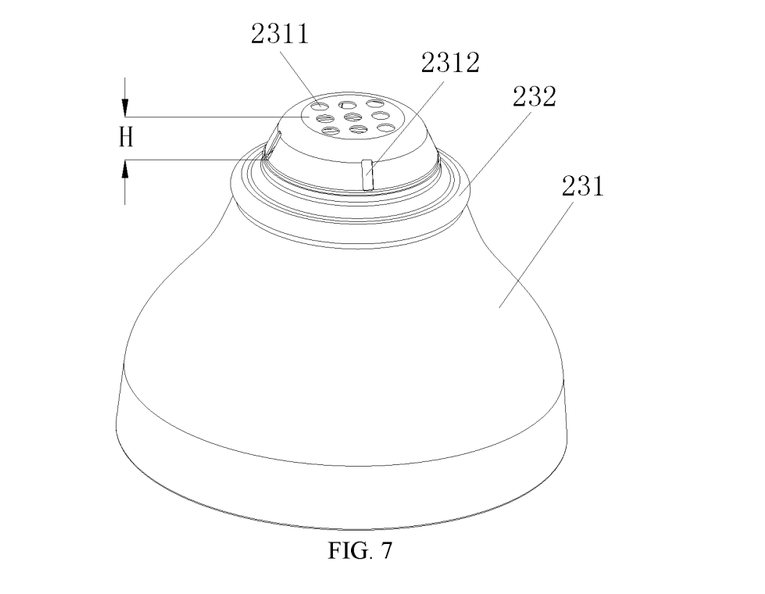
FIG. 7 shows a tridimensional schematic structural diagram of the energy gathering cover in FIG. 5.
Figure 12:
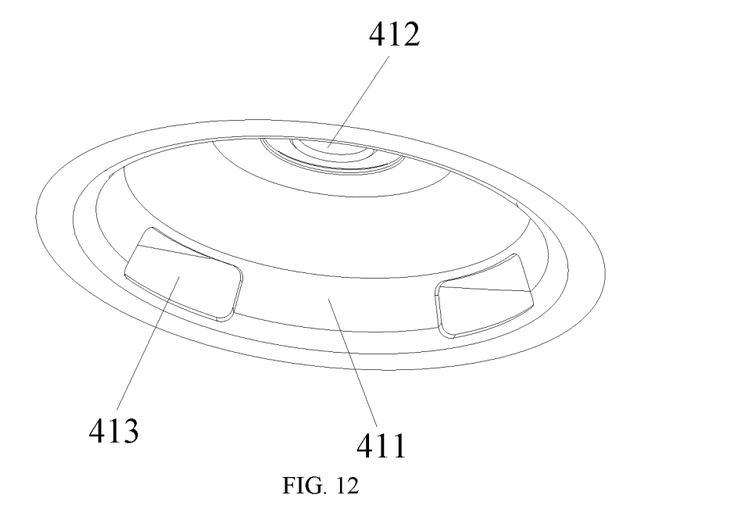
FIG. 12 is an enlarged view of the place B in FIG. 11.
Figure 13:
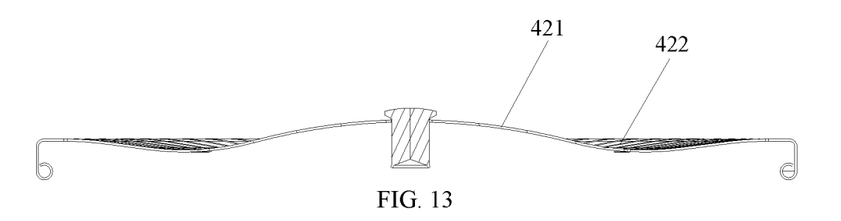
FIG. 13 is a schematic sectional view of the steaming rack in FIG. 10.

Specifically, as shown in FIG. 5 and FIG. 7, the energy gathering cover 23 includes an energy gathering cover body 231 and a sealing element 232. The energy gathering cover body 231 is a cone-shaped structure, and an upper end of the cone protrudes out of a bottom of the steaming container 41. The sealing element 232 is disposed at a joint between the energy gathering cover body 231 and the steaming container 41. In this embodiment, a top of the energy gathering cover body 231 is provided with a first air vent 2311 and a first water vent 2312, the first air vent 2311 is positioned above the first water vent 2312, and the first air vent 2311 communicates with the guide channel 43. As shown in FIG. 12, a bottom of the steaming container 41 is provided with a recess 411, and the recess 411 is provided with a second air vent 412 and a second water vent 413. The second air vent 412 and the first air vent 2311 are disposed corresponding to each other, and the second water vent 412 and the first water vent 2312 are disposed corresponding to each other. The first air vent 2311 and the second water vent 412 implement steam transmission between the inside of the energy gathering cover 23, the guide channel 43 and the inside of the steaming container 41. The first water vent 2312 and the second water vent 413 implement water transmission between the inside of the energy gathering cover 23, the guide channel 43 and the inside of the steaming container 41.

The first air vent 2311 is disposed above the first water vent 2312, and a certain drop height H is provided between the first air vent 2311 and the first water vent 2312 in a vertical direction, which may ensure that sprayed water droplets flow into the energy gathering cover 23 through the first water vent 2312 to implement collection the water droplets, preventing the sprayed water droplets from entering the steaming container with steam and gelatinizing the food material at the bottom of the steaming rack, thereby greatly improving taste of the food material at the bottom of the steaming rack. Further, smooth steam injection through the first air vent 2311 may be ensured, thereby improving efficiency and quality of steam supply. In this embodiment, the drop height H between the first air vent 2311 and the first water vent 2312 in the vertical direction is 50 mm. However, the present disclosure is not limited thereto. In other embodiments, the drop height H may be other values less than or equal to 100 mm, for example, 5 mm, 10 mm, 15 mm, 20 mm, 25 mm, 30 mm, 40 mm, 50 mm, 60 mm, 65 mm, 70 mm, 75 mm, 80 mm, 90 mm, 95 mm or 100 mm.

The sealing element 232 is an elastic sealing ring and is used for sealing the joint between the energy gathering cover body 231 and the steaming container 41, such that the energy gathering cover body 231 communicates with the steaming container 41. The sealing element 232 is lower than the first water vent 2312. In this embodiment, the upper cone-shaped end of the energy gathering cover body 231 is inserted into the recess 411 at the bottom of the steaming container 41, and the height difference between the upper cone-shaped end of the energy gathering cover 23 and the very bottom of the steaming container 41 is denoted by P, which is less than or equal to 120 mm.

The cone-shaped structure of the energy gathering cover body 231 facilitates heated air to gather at the upper end of the energy gathering cover body 231, such that the gathered air poses pressure in the energy gathering cover body 231, which boosts steam to enter the steaming container and improves the efficiency and quality of steam transmission. The upper cone-shaped end of the energy gathering cover body 231 is inserted into the recess 411, such that the first air vent 2311 and the first water vent 2312 at the top of the energy gathering cover body 231 are entirely disposed in the outer wall of the steaming container 41, thereby improving the efficiency and quality of steam transmission. In this embodiment, the height difference P between the upper cone-shaped end of the energy gathering cover 23 and the very bottom of the steaming container 41 is equal to 60 mm. However, the present disclosure is not limited thereto. In other embodiments, the height difference P between the upper cone-shaped end of the energy gathering cover body 231 and the very bottom of the steaming container 41 may be other reasonable values less than 120 mm, for example, 5 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 115 mm, and 120 mm, etc.

Figure 8:
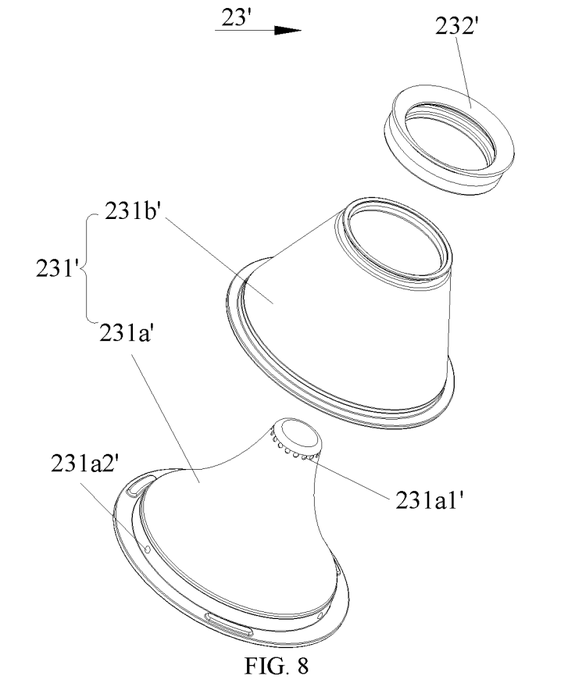
FIG. 8 shows a tridimensional schematic structural diagram of an energy gathering cover according to another embodiment of the present disclosure.
Figure 9:
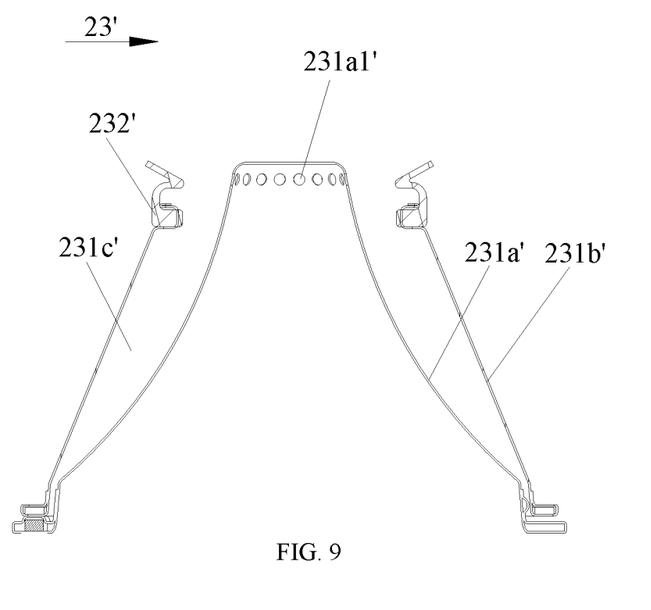
FIG. 9 is a schematic sectional view of the energy gathering cover as shown in
FIG. 8.

To further shorten time required for producing steam by heating, the energy gathering cover body 231 is a double-layer vacuum structure, which may increase the heat insulation performance of the energy gathering cover, improve the efficiency of heat transfer between the energy gathering cover and the water storage container, and reduce heat loss inside the energy gathering cover. However, the present disclosure is not limited thereto. In other embodiments, as shown in FIG. 8 and FIG. 9, the energy gathering cover 23' includes: an energy gathering cover body 231' and a sealing element 232'. The energy gathering cover body 231' includes an energy gathering inner cover 231a' and an energy gathering outer cover 231b'. A side wall of the energy gathering inner cover 231a' is provided with an air vent 231a1' communicating with a guide channel 43'. The energy gathering outer cover 231b' is sleeved on the outside of the energy gathering inner cover 231a' and forms an accommodating space 231c' together with the energy gathering inner cover 231a'. The top of the energy gathering outer cover 231b' is openmouthed, and the air vent 231a1' is positioned higher than the top of the energy gathering outer cover 231b'. The sealing element 232' is disposed at a joint between the energy gathering outer cover 231b' and the steaming container.

By arranging the air vent 231a1' on the side wall of the energy gathering inner cover, in the process of cooking food material, water in the energy gathering inner cover 231a' is heated to generate a lot of steam, and the steam mingled with water droplets is outputted from the air vent 231a1'. In the initial procedure of output, under the action of gravity, the water droplets drop back to the accommodating space 231c'. Therefore, it is effectively prevented that the food material at the bottom of the steaming rack above the energy gathering cover is gelatinized, and thus taste of the food material is greatly improved. The air vent 231a1' is higher than the top of the energy gathering outer cover 231b', which ensures that the air vent 231a1' can be closer to the steaming container when the energy gathering cover 23' and the steaming container are assembled, thus significantly improving heat transmission, and further effectively preventing the energy gathering outer cover 231b' from obstructing and interfering with steam transmission.

In FIG. 8 and FIG. 9, both the diameter of the energy gathering inner cover 231a' and the diameter of the energy gathering outer cover 231b' gradually decrease from the bottom to the top of the energy gathering inner cover 231a'. Therefore, steam in the energy gathering inner cover 231a' gradually gathers at the top of the energy gathering inner cover 231a', such that the top of the energy gathering inner cover 231a' has high pressure, which greatly improves steam output efficiency. Further, the output pressure of the steam is higher. Therefore, in the initial stage of output, it is ensured that the steam and the water droplets can be outputted to a certain distance radially along the energy gathering inner cover, and lots of water droplets drop back to the energy gathering inner cover within this distance. Further, the side wall of the energy gathering inner cover 231a' is a circular curved surface curved toward the inside of the energy gathering inner cover, whereas the energy gathering outer cover 231b' is shaped like a hollow circular truncated cone, which widens the radial width of the accommodating space where the air vent 231a1' is, and further prolongs the path along which the water droplets drop back.

In FIG. 8 and FIG. 9, the side wall of the energy gathering inner cover 231a' is provided with a water inlet 231a2', which is formed at one end of the side wall of the energy gathering inner cover 231a' close to the bottom of the energy gathering inner cover 231a'. The water inlet 231a2' not only implements intercommunication between the energy gathering inner cover and the accommodating space, but also ensures that an effective water seal is formed between the energy gathering cover and the water storage container to prevent air in the water storage container from entering the steaming container through the energy gathering cover so as to prevent steam from having a negative effect on cooking the food material.

In this embodiment, as shown in FIG. 10-FIG. 13, the steaming rack 42 includes a barrier plate 421 and a steam transmission plate 422. The steam transmission plate 422 is provided with a through hole 4221, the steam transmission plate 422 is disposed at a periphery of the barrier plate 421, and the barrier plate 421 bulges toward the top of the steaming container 41. In the process of steam transmission, when steam enters the steaming chamber 44, after water droplets splashed from boiled water enter the steaming chamber 44, the splashed water droplets are obstructed by the barrier plate 421, and thus the splashed water droplets drop back to the steaming chamber 44 and flow back to the energy gathering cover 23 through the second water vent 413 and the guide channel 43. In this way, collection of the water droplets splashed from boiled water is implemented, and the water droplets splashed from boiled water are prevented from coming into contact with rice on the steaming rack, thereby improving the quality of rice heated by steam and optimizing taste of the rice.

In this embodiment, the steam transmission plate 422 is disposed at a periphery of the barrier plate 421, after steam enters the steaming rack, the splashed water droplets mingled in the steam are obstructed by the barrier plate 421, and then are dispersed to the steam transmission plate 422 in the circumferential direction, such that the steam is transmitted into the steaming container 41 through the through hole 4221 on the steam transmission plate 422. The barrier plate 421 bulges toward the top of the steaming container 41, such that the steam has enough time to fill the steaming chamber 44, thereby prolonging the time of contact between the steam and the barrier plate 421 and improving smoothness of transmission of the steam. The barrier plate 421 naturally presses the steam down, and an upward extrusion force is generated when the steam reaches the steam transmission plate 422, which improves efficiency of the steam passing through the steam transmission plate 422.

In this embodiment, the barrier plate 421 is installed above the second air vent 412. Water droplets splashed from boiled water enter the steaming chamber 44, and the water droplets are obstructed by the barrier plate 421 and then fall back into the energy gathering cover through the second water vent 413 and the guide channel 43.

Water droplets enter the steaming container 41 through the first water vent 2312 on the energy gathering cover body 231. Therefore, in this embodiment, the barrier plate 421 is positioned above the energy gathering cover 23, and the vertical projection area of the barrier plate 412 is larger than the area of the top of the energy gathering cover 23. In this way, water droplets boiled and splashed out of the energy gathering cover body 231 can be effectively obstructed, thereby greatly improving the obstruction quality.

In this embodiment, the steaming assembly 4 further includes a lid 45 for covering the steaming container, wherein the lid 45 is provided with a steam transmission channel 451.

In this embodiment, as shown in FIG. 1 and FIG. 2, the pressure regulating assembly 5 includes an air pump 51 for boosting pressure in the first chamber and a relief valve 52 for reducing pressure in the first chamber. The air pump 51 is provided with an air inlet 511, between the shell 21 and the water storage container 22 there is provided a pipe 53 for communicating the first chamber 24 with the air inlet 511, the water storage container 22 is provided with a communicating channel for communicating with outside air, and the relief valve 52 is installed on the communicating channel. By means of the air pump 51, the pressure in the first chamber 24 may be boosted, such that water in the first chamber 24 may flow into the steaming container 41 to implement the objective of soaking the food material placed on the steaming rack 42. By means of the relief valve 52, the pressure in the first chamber 24 may be reduced, such that water in the steaming container 41 may flow back into the first chamber 24 to implement the objective of water drainage. The pressure regulating assembly 5 implements water inflow and water draining of the steaming assembly 4, and the pressure regulating assembly 5 is simple in structure and good in use effect.

The water storage container 22 includes a bottom wall 221 and a side wall 222 integrally molded, wherein the side wall 222 is formed by upward extending from the circumferential edge of the bottom wall 221. However, the present disclosure is not limited thereto. In other embodiments, the bottom wall 221 and the side wall 222 of the water storage container 22 also may adopt a split-molded structure, wherein the split-molded bottom wall and the side wall are fixed together by means of welding technology or the like.

An upper end close to a top surface of the side wall 222 is provided with a lug 223. The lug 223 may be integrally molded with the side wall 222 or may be individually molded and then is assembled onto the water storage container. The lug 223 is provided with a through hole 2231 communicating with the first chamber 24. The top of the pipe 53 is sleeved on the lug 223, and the pipe 53 communicates with the first chamber 24 via the through hole 2231. However, the present disclosure does not limit the mode of connection between the pipe and the lug. In other embodiments, the pipe may be internally inserted into the lug.

In this embodiment, the shell 21 includes a bottom shell 211 below the bottom wall 221 and an outer shell 212 outside the side wall 221. The bottom shell and the outer shell are fixedly connected together to form an accommodating chamber for housing the water storage container 22, which is fixedly installed in the shell 21.

Figure 14:
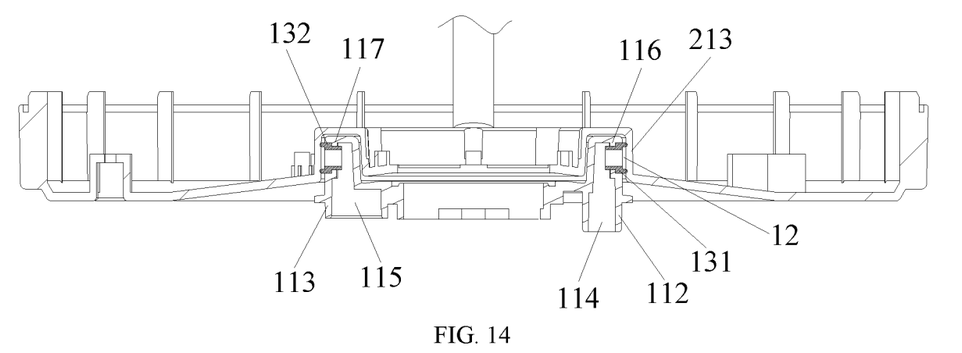
FIG. 14 is a partial sectional view of a bottom shell and a coupling bracket in a rice cooking device according to an embodiment of the present disclosure.
Figure 15:
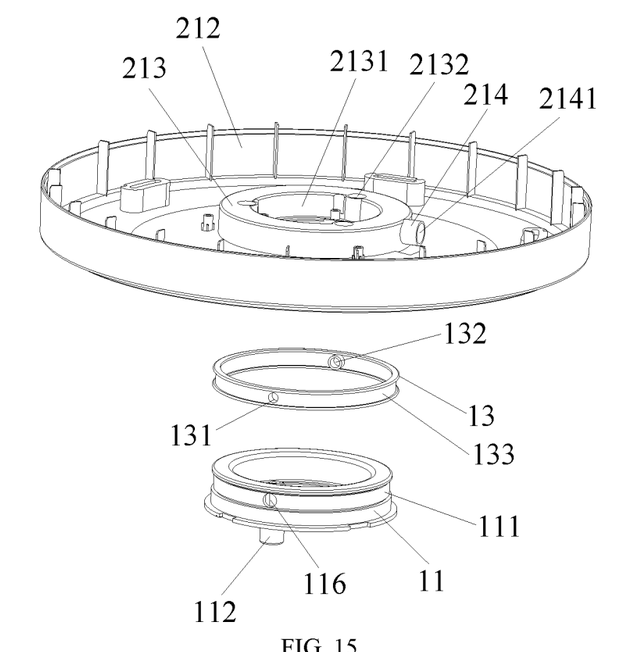
FIG. 15 is a schematic diagram showing assembly between a coupling bracket, a sealing ring and a protruding platform in a rice cooking device according to an embodiment of the present disclosure.

In this embodiment, as shown in FIG. 14 and FIG. 15, a protruding platform 213 for communicating with the pipe 53 is disposed at the bottom of the shell 21, and a coupling bracket 11 is disposed on the base 1 The the protruding platform 213 is sleeved on and connected with the coupling bracket 11 when the shell 21 on the water storage assembly is disposed on the base 1, a communicating channel 12 is formed between the protruding platform 213 and the coupling bracket 11, and the communicating channel 12 communicates with the air pump 51 and the relief valve 52 in the pressure regulating assembly 5. The relief valve 52 can open or shut off the communication between the communicating channel 12 and the outside air.

In this embodiment, the base 1 includes a sealing ring 13 sleeved on the coupling bracket 11, and the protruding platform 213 is provided with an assembly hole 2131 for insertion of the coupling bracket. The communicating channel 12 is formed in space between the protruding platform 213 and the sealing ring 13 when the protruding platform 213 is sleeved on the coupling bracket 11, and the sealing ring 13 is provided with a hollow column head communicating the communicating channel 12 with the pressure regulating assembly 5. In this embodiment, the communicating channel 12 is simple in structure, which may be formed by installing the water storage assembly 2 on the base 1. Therefore, the objective of communicating the air inlet 511 with the pipe 53 may be satisfied when the rice cooking device works.

The coupling bracket 11 supports the sealing ring 13, such that it is ensured that the communicating channel 12 is formed between the protruding platform 213 and the sealing ring 13 when the sealing ring 13 is inserted into the assembly hole 2131, and it is avoided that excessive deformation caused when the sealing ring 13 is inserted into the assembly hole 2131 has a negative effect on the structure of the communicating channel 12. To prevent shifting caused by friction between the sealing ring and the protruding platform when the sealing ring is inserted into the assembly hole, a limit slot 111 is provided on a circumferential outer wall of the coupling bracket 11, and the sealing ring 13 is positioned in the limit slot 111. Moreover, the sealing ring 13 has a certain elasticity, and thus can effectively improve leakproofness of the communicating channel 12, thereby preventing air leakage of the communicating channel 12 from having a negative effect on pressure boosting operation of the air pump 51 on the water storage container 22. A groove 133 is provided on a circumferential outer wall of the sealing ring 13 to ensure the communicating channel 12 has adequate cross sectional area so as to allow air current can smoothly circulate.

The coupling bracket 11 is ring-shaped, a circular mating structure is adopted between the coupling bracket 11 and the protruding platform 213, and the communicating channel 12 also is ring-shaped. As thus, mating between the coupling bracket 11 and the protruding platform 213 is not limited in the circumferential direction. The water storage assembly 2 does not need to be installed on the base in a certain orientation, which facilitates in improving convenience of use.

A specific gas path is as below: an outer wall of the protruding platform 213 is provided with a first joint 214 mating with the bottom of the pipe 53, and the bottom of the pipe 53 is sleeved on the first joint 214. The first joint 214 is provided with a first communicating hole 2141 communicating with the communicating channel 12. The bottom of the coupling bracket 11 is provided with a second joint 112 and a third joint 113 in a staggered way. The second joint 112 is provided with a second communicating hole 114 communicating with the communicating channel 12, and the third joint 113 is provided with a third communicating hole 115 communicating with the communicating channel 12. The pressure regulating assembly 5 further includes a first connecting pipe 54 and a second connecting pipe 55. Both the first connecting pipe 54 and the second connecting pipe 55 are disposed in the base 1. The first connecting pipe 54 is used for communicating the second communicating hole 114 with the air inlet 511, a top of the first connecting pipe 54 is sleeved on the second joint 112, and a bottom of the first connecting pipe 54 is sleeved on the air inlet 511 of the air pump. The second connecting pipe 55 is used for communicating the third communicating hole 115 with outside air. The bottom of the base 1 is provided with a gas vent 14. Atop of the second connecting pipe 55 is sleeved on the third joint 113, and a bottom of the second connecting pipe 55 extends to the gas vent 14. The relief valve 52 is disposed on the second connecting pipe 55. The objective of the reducing pressure in the water storage container is implemented by controlling discommunication between the water storage container 22 and outside air. The relief valve 52 is simple and effective in structure, and can satisfy requirements of use. The communicating channel 12 concurrently serves as a constituent part of the pressure boosting structure and the pressure relief structure, such that constituent assemblies of the pressure regulating mechanism are reduced, which is advantageous to simplifying the structure of the pressure regulating mechanism and allowing the structure of the pressure regulating mechanism to be more compact.

To implement the objective of communicating the second communicating hole 114 and the third communicating hole 115 with the communicating channel 12, the inner wall of the sealing ring 13 is provided with a first hollow column head 131 corresponding to the second joint 112 and a second hollow column head 132 corresponding to the third joint 11. The circumferential direction of the coupling bracket 11 is provided with a first pillar hole 116 and a second pillar hole 117. The first pillar hole 116 corresponds to the second communicating hole 114, and the second pillar hole 117 corresponds to the third communicating hole 115. When the sealing ring 13 is sleeved on the coupling bracket, the first hollow column head 131 is inserted into the first pillar hole 116 to implement communication between the second communicating hole 114 and the communicating channel 12. The second hollow column head 132 is inserted into the second pillar hole 117 to implement communication between the third communicating hole 115 and the communicating channel 12.

Figure 16:
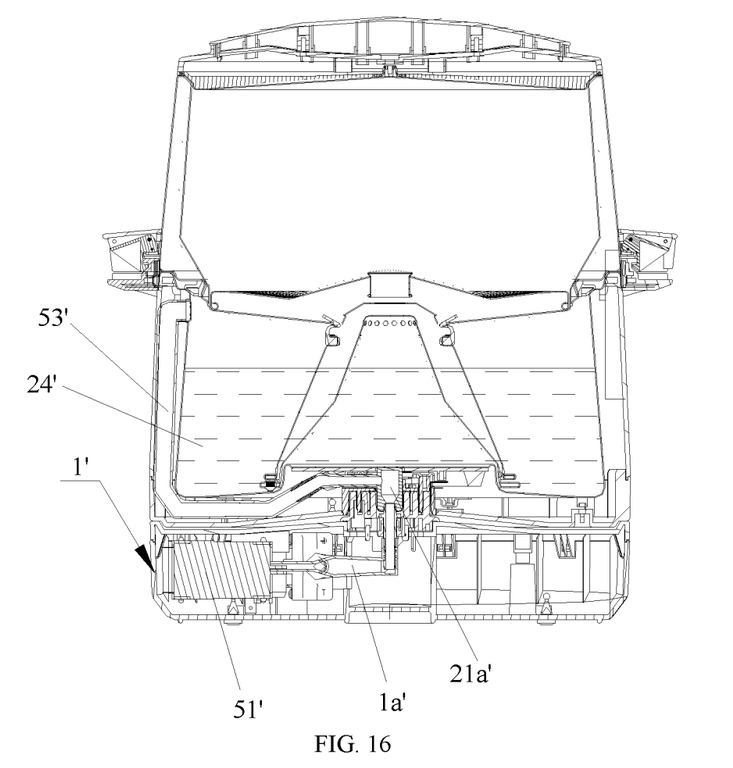
FIG. 16 is a schematic structural diagram of a rice cooking device according to another embodiment of the present disclosure.

However, the present disclosure does not limit the specific structure of the communicating channel 12. In other embodiments, in the rice cooking device as shown in FIG. 16, in the base 1' there is provided a base communicating channel 1a' communicating the air inlet of the air pump 51'. The bottom of the shell 21' is provided with a joint 21a' connecting the base communicating channel 1a', and the other end of the joint 21a' is connected to the pipe 53', which may increase the pressure in the first chamber 24'.

In this embodiment, the heating assembly 3 includes a heating body 31 disposed between the shell and the water storage container. The heating body 31 merely heats water in the energy gathering cover 23, which can effectively shorten time required for generating steam, and thus can effectively shorten time required for steaming the food material. Therefore, it is advantageous to improving efficiency of the rice cooking device in cooking the food material.

In terms of electrical control, in this embodiment, the base 1 is internally provided with a control panel 14. Both the air pump 51 and the relief valve 52 are electrically connected to the control panel 14. To implement effective control of water level of the heating body 31 and the water storage container 22 by the control panel 14, an upper electric coupler 27 for implementing electrical connection is provided between the water storage assembly 2 and the base 1, and on the inner wall of the water storage container there is provided a water level sensor 28. In this embodiment, the relief valve 52 is a solenoid valve, the water level sensor 28 is an electrode-type water level sensor, and the heating body 31 is a heating tube.

A central portion of the bottom shell 211 of the shell 21 is connected to the upper electric coupler 27 by means of a fixed holder 29. Both the heating body 31 and the water level sensor 28 are electrically connected to the upper electric coupler 27. The top of the base 1 is provided with a lower electric coupler 15 mating with the upper electric coupler 27, wherein the lower electric coupler 15 is electrically connected to the control panel 14. When the water storage assembly 2 is disposed on the base 1, the objective of electrically connecting the heating body 31 and the water level sensor 28 to the control panel 14 by means of mating between the upper electric coupler 27 and the lower electric coupler 15 is implemented. In this way, on-off of the electrical connection is implemented. To prevent interference caused during installation, both the fixed holder 29 and the upper electric coupler 27 are disposed in the assembly hole 2131, and a gap for insertion of the coupling bracket 11 is provided between the fixed holder 29 and the inner wall of the protruding platform 213.

In this embodiment, the rice cooking device further includes an ejection mechanism 6 disposed on the bottom wall 221. The ejection mechanism 6 includes a spring 61 and an elastomer 62. The top of the spring 61 is connected to the bottom of the bottom wall 221, and the elastomer 62 is connected to the bottom of the spring 61. When the water storage assembly 2 is disposed on the base 1, the elastomer 62 comes into contact with the base 1 and thus compresses the spring 61. When the water storage assembly 2 is removed from the base 1, force applied to the spring 61 is reduced, and force is applied to the elastomer 62 when the spring 61 is restored to its original shape. Applying a force to the base 1 by the elastomer 62 makes it easy to remove the water storage assembly 2 from the base 1. Particularly when the sealing ring 13 is inserted into the assembly hole 2131 to form the communicating channel with the protruding platform 213, a certain static friction exists between the sealing ring 13 and the protruding platform 213, but the adverse effect of the static friction may be reduced or even eliminated by means of the ejection mechanism 6, which makes it easy to remove the water storage assembly 2 from the base.

In this embodiment, as shown in FIG. 15, to better eliminate the acting force between the sealing ring 13 and the protruding platform 213 such that it is easy to remove the water storage assembly 2 from the base 1, the bottom wall 221 is provided with a cylindrical hole 2121 for installation of the spring 61. The cylindrical hole 2121 is positioned at an inner side of the protruding platform 213, and the inner side of the protruding platform 213 is provided with an escape hole 2132 for the elastomer 62 to pass through. The top of the cylindrical hole 2121 is closed whereas the bottom thereof is open, and the top of the spring 61 fixedly comes into contact with an inner top wall of the cylindrical hole. When the water storage assembly 2 is disposed on the base 1, the elastomer 62 exactly abuts against the top surface of the coupling bracket 11, such that the spring 61 is compressed. The elastomer 62 moves back and forth along the escape hole 2132, and the escape hole 2132 also plays a role in location limiting.

When the rice cooking device provided by this embodiment works, the water storage assembly 2 is placed on the base 1, the energy gathering cover 23 is placed in the water storage container 22, the steaming rack 42 is placed in the steaming container 41, the food material is placed on the steaming rack 42, the lid 45 is covered, the steaming assembly 4 is placed on the water storage assembly 2, and the top of the energy gathering cover 23 is inserted into the recess 411. The rice cooking device is powered on such that it is started. When the air pump 51 works, air is filled into the first chamber 24 in the water storage container 22 through the communicating channel 12 and the pipe 53, such that the pressure in the water storage container increases and water in the water storage container flows from the water flow channel 26 into the energy gathering cover 23 and flows upward into the steaming container 41 through the guide channel 43 to soak the food material in the steaming container 41. After the food material is soaked, the relief valve 52 is opened such that the pressure in the first chamber 24 is reduced, water in the steaming container 41 flows downward into the energy gathering cover 23 through the guide channel, and a part of the water flows back into the water storage container 22 through the water flow channel.

Next, the heating body 31 works to heat the water in the energy gathering cover 23, such that the water is boiled and steam is generated. The steam enters the steaming container through the first air vent 2311, the guide channel 43 and the second air vent 412 to steam the food material via the through hole on the steaming container, as the path indicated by the arrow C1 in FIG. 2. Water droplets formed after steam condenses, water remaining in the food material and water droplets rising with steam flow back into the energy gathering cover 23 through the second water vent 413, the guide channel 43 and the first water vent 2312, as the path indicated by the arrow C2 in FIG. 2.

Of course, the food material may be soaked for many times by setting a process, or the food material may be soaked within a period of time after heating, and the action of water drainage is carried out after water is boiled. Specific working procedures may be set based on different modes of heating of different food materials.

In conclusion, in the rice cooking device provided by the present disclosure, the energy gathering cover is disposed in the water storage container, such that the energy gathering cover divides the water storage container into the first chamber and the second chamber. The water flow channel is formed between the first chamber and the second chamber. The guide channel is formed between the energy gathering cover and the steaming container. Therefore, when the pressure regulating assembly changes the pressure in the first chamber, water in the water storage container is pressed into the steaming container through the water flow channel and the guide channel, or the water in the steaming container is sucked back into the water storage container along the opposite path. It is convenient for water to flow into and drain out of the steaming chamber, and corresponding conditions for water inflow and water draining can be achieved simply by controlling the pressure in the first chamber. Further, in the stage of cooking rice, the guide channel also serves as a steam transmission channel to combine the water channel and the steam channel, which not only greatly simplifies the structure of the rice cooking device but also effectively solves the problem that water inflow and water draining assemblies of an existing rice cooking device have a negative effect on steam transmission efficiency, thereby significantly increasing steam heating efficiency and making cooked rice taste good.

Although the present disclosure has been disclosed above by preferred embodiments, these preferred embodiments are not intended for limiting the present disclosure. Those skilled in the art may make some modifications and embellishments without departing from the spirit and the scope of the present disclosure. Therefore, the scope of protection of the present disclosure shall be subject to the protection scope defined by the claims.

What is claimed is:

1. A rice cooking device, comprising:
   a base;
   a water storage assembly, comprising a shell, a water storage container, and an energy gathering cover, wherein the shell is disposed at the base, the water storage container is disposed in the shell, the energy gathering cover is disposed in the water storage container, the energy gathering cover divides the water storage container into a first chamber positioned outside the energy gathering cover and a second chamber positioned inside the energy gathering cover, a water flow channel is provided between the first chamber and the second chamber, a bottom of the water storage container is provided with an engaging platform for engaging with the energy gathering cover, and a gap between an outer wall of the engaging platform and an inner wall of the energy gathering cover forms the water flow channel;
   a heating assembly, disposed between the shell and the water storage container;
   a steaming assembly, comprising a steaming container and a steaming rack, wherein the steaming container is disposed at the water storage assembly, a guide channel is formed between the steaming container and the energy gathering cover, the guide channel respectively communicates with the steaming container and the energy gathering cover, and a steaming chamber is formed between the steaming rack and the steaming container; and
   a pressure regulating assembly, disposed at the base and communicates with the water storage container, wherein the pressure regulating assembly is configured to regulate pressure in the first chamber to press water in the water storage container into the steaming container through the water flow channel or the guide channel or suck water in the steaming container back into the water storage container.

2. The rice cooking device according to claim 1, wherein the energy gathering cover comprises an energy gathering cover body and a sealing element, the energy gathering cover body is a cone-shaped structure, an upper end of the cone protrudes out of a bottom of the steaming container, and the sealing element is disposed at a joint between the energy gathering cover body and the steaming container.

3. The rice cooking device according to claim 1, wherein a top of the energy gathering cover is provided with a first air vent and a first water vent, the first air vent is positioned above the first water vent, and the first air vent communicates with the guide channel.

4. The rice cooking device according to claim 3, wherein a bottom of the steaming container is provided with a recess, the recess is provided with a second air vent and a second water vent, the second air vent and the first air vent are disposed corresponding to each other, and the second water vent and the first water vent are disposed corresponding to each other.

5. The rice cooking device according to claim 1, wherein the energy gathering cover comprises:
an energy gathering cover body, comprising:
an energy gathering inner cover, a side wall of the energy gathering inner cover is provided with an air vent communicating with the guide channel; and
an energy gathering outer cover, sleeved on an outside of the energy gathering inner cover and forming an accommodating space together with the energy gathering inner cover, wherein a top of the energy gathering outer cover is openmouthed, and the air vent is positioned higher than the top of the energy gathering outer cover; and
a sealing element, disposed at a joint between the energy gathering outer cover and the steaming container.

6. The rice cooking device according to claim 5, wherein both a diameter of the energy gathering inner cover and a diameter of the energy gathering outer cover gradually decrease from a bottom to a top of the energy gathering inner cover, and the side wall of the energy gathering inner cover is a circular curved surface curved toward an inside of the energy gathering inner cover.

7. The rice cooking device according to claim 1, wherein the steaming rack comprises a barrier plate and a steam transmission plate, the steam transmission plate is provided with a through hole, the steam transmission plate is disposed at a periphery of the barrier plate, and the barrier plate bulges toward a top of the steaming container.

8. The rice cooking device according to claim 7, wherein the barrier plate is disposed above the energy gathering cover, and a vertical projection area of the barrier plate is larger than an area of a top of the energy gathering cover.

9. The rice cooking device according to claim 1, wherein the pressure regulating assembly comprises an air pump for boosting pressure in the first chamber and a relief valve for reducing the pressure in the first chamber, the air pump is provided with an air inlet, a pipe for communicating the first chamber with the air inlet is provided between the shell and the water storage container, the water storage container is provided with a communicating channel for communicating with outside air, and the relief valve is configured to open or shut off communication between the communicating channel and the outside air.

10. The rice cooking device according to claim 9, wherein a protruding platform for communicating with the pipe is disposed at a bottom of the shell, a coupling bracket is disposed on the base, the protruding platform is sleeved on and connected with the coupling bracket when the water storage assembly is disposed on the base, the communicating channel is formed between the protruding platform and the coupling bracket, the communicating channel communicates with the air inlet of the air pump and the pipe, and the communicating channel communicates with the relief valve.

11. The rice cooking device according to claim 10, wherein the base comprises a sealing ring sleeved on the coupling bracket, the communicating channel is formed between the protruding platform and the sealing ring when the protruding platform is sleeved on and connected with the coupling bracket, and the sealing ring is provided with a hollow column head connecting the communicating channel with the pressure regulating assembly.

* * * * *